Jan. 10, 1928.
B. M. HALL
POULTRY FEEDER
Filed Sept. 21, 1926
1,656,061
2 Sheets-Sheet 1
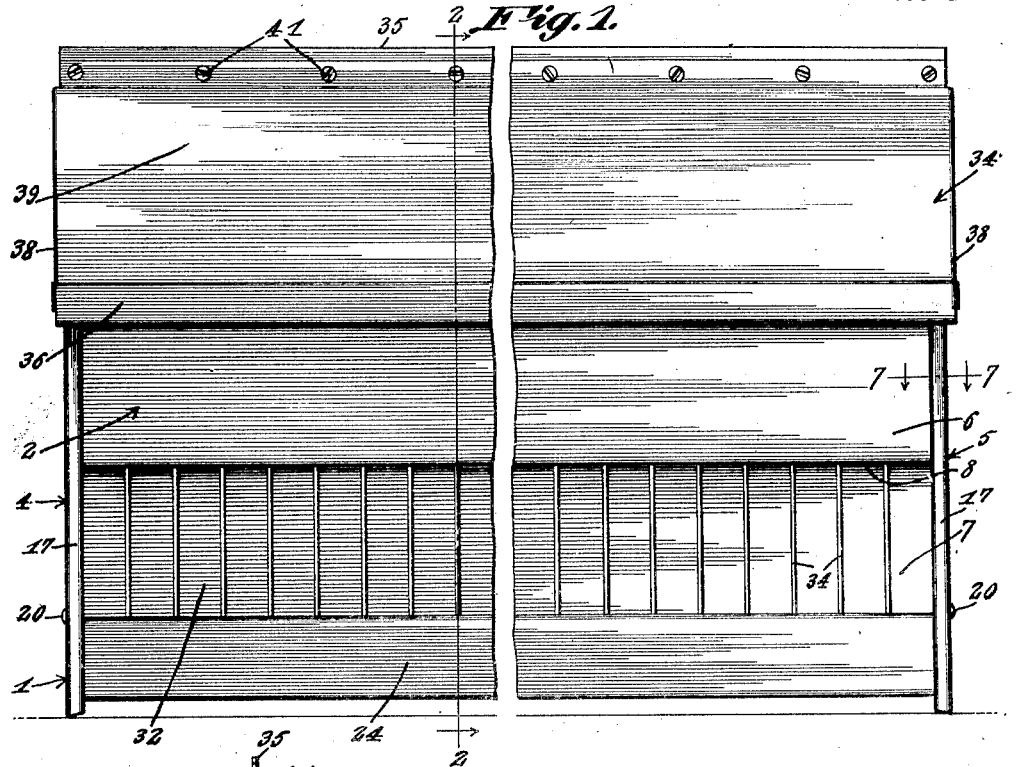
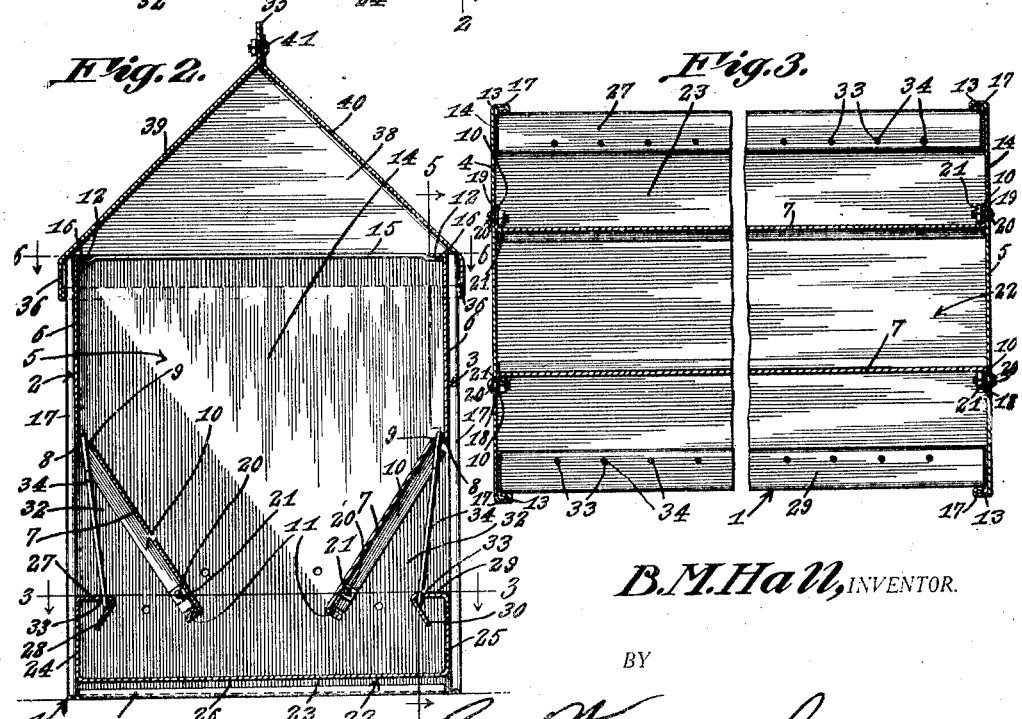
B. M. Hall, INVENTOR.
BY Geo. Kimmel ATTORNEY.

Jan. 10, 1928.
B. M. HALL
POULTRY FEEDER
Filed Sept. 21, 1926
1,656,061
2 Sheets-Sheet 2
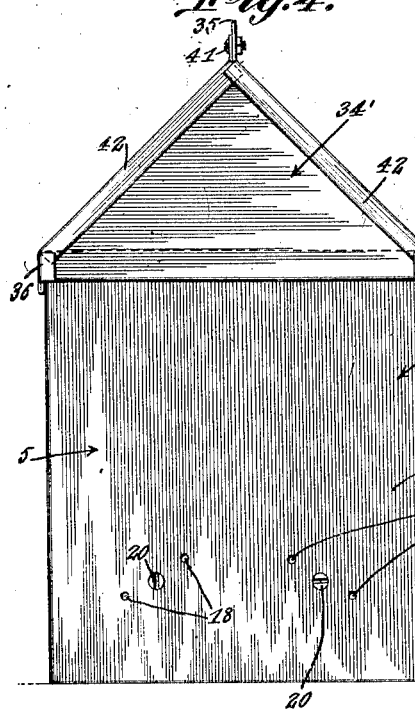
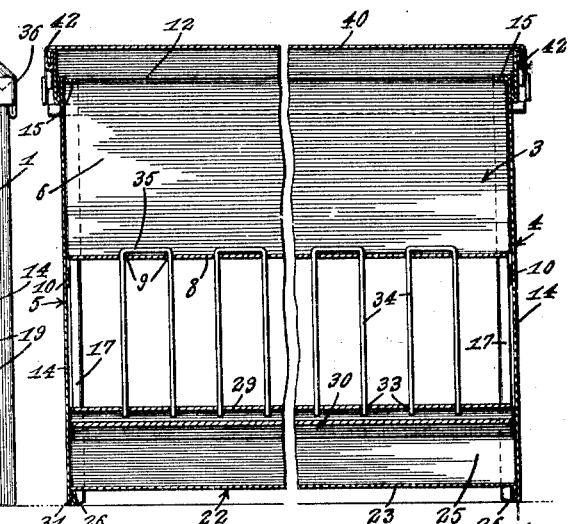
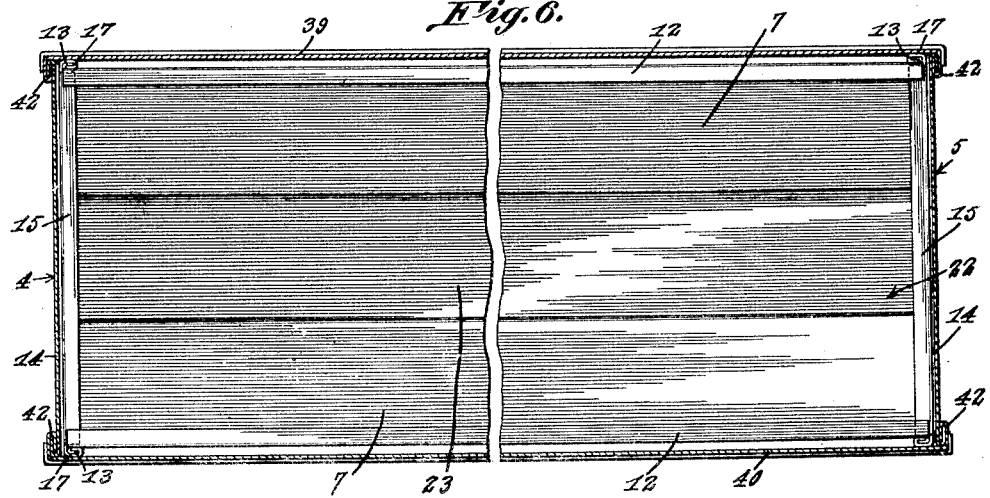
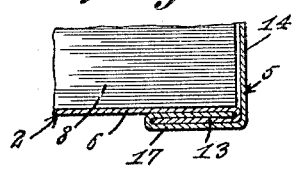
B. M. Hall, INVENTOR.
BY Geo. F. Kimmel, ATTORNEY.

Patented Jan. 10, 1928.

1,656,061

UNITED STATES PATENT OFFICE.

BURL M. HALL, OF McCOMB, OHIO.

POULTRY FEEDER.

Application filed September 21, 1926. Serial No. 136,816.

This invention relates to a poultry feeder, and has for its object to provide, in a manner as hereinafter set forth, a feeder of such class with means to prevent the fowls from raking out the feed under such conditions reducing waste of feed to a minimum.

A further object of the invention is to provide, in a manner as hereinafter set forth, a poultry feeder formed from a series of detachably connected elements, that is to say the body portion of the feeder, and with such elements constructed and arranged to enable the expeditious disassembling thereof when occasion requires and furthermore providing for the shipment of the feeder in a knock-down position.

A further object of the invention is to provide, in a manner as hereinafter set forth, a poultry feeder so constructed and arranged as to prevent the fowls from roosting on the top thereof and which provides for a sanitary characteristic.

Further objects of the invention are to provide, in a manner as hereinafter set forth, a poultry feeder which is simple in its construction and arrangement, strong, durable, conveniently assembled and disassembled when desired, sanitary, thoroughly efficient in its use, reducing waste of feed to a minimum, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a fragmentary view in front elevation of a poultry feeder in accordance with this invention.

Figure 2 is a section on line 2—2 Figure 1.

Figure 3 is a section on line 3—3 Figure 2.

Figure 4 is a side elevation of a poultry feeder in accordance with this invention.

Figure 5 is a section on line 5—5 Figure 2.

Figure 6 is a section on line 6—6 Figure 2.

Figure 7 is a section on line 7—7 Figure 1.

A poultry feeder, in accordance with this invention, comprises an open top body portion or housing and a removable closure for said open top. The body portion of the feeder, which is referred to generally by the reference character 1, comprises a front wall, a rear wall, referred to generally by the reference characters 2 and 3, and a pair of side walls 4, 5. The front and rear walls 2, 3 respectively are of like construction, but one will be described as the description of one will apply to the other.

The front as well as the rear wall includes a vertically disposed upper portion 6 and an inwardly inclined lower portion 7 connected with the upper portion 6 by an inwardly extending angularly disposed intermediate portion 8, which provides a support or hanger and is formed with a series of spaced openings 9 arranged in pairs. The openings 9 are disposed in a row extending lengthwise of the intermediate portion 8 and are arranged at the longitudinal median of said portion 8. The lower portion 7 at each side is flanged as at 10 and with said flange at each side projecting outwardly. The intermediate portion 7 is furthermore provided at its lower end with a flange 11 which is disposed outwardly and extends at a downward inclination. The flanges 10 are coextensive with the sides of the lower portion 7 and the flange 11 is coextensive with the lower end of said portion 7.

The upper portion 6, at its top, is provided with an inwardly extending flange 12 of a length coextensive with the width of said portion 6. The upper portion 6 at each side is provided with an inwardly extending flange 13, more clearly shown in Figure 7 and which opposes, as well as being spaced from, the outer face of the portion 6. The length of the flange 13 is coextensive with the height of the portion 6. The function of the flanges 13 will be presently referred to.

The front wall 2, as well as the rear wall 3, in vertical section, is of less length than the length of either of the side walls in vertical section. The front and rear walls are suspended and interengage with the side walls of the body portion 1. The lower portions 7 of the front and rear walls extend in opposite directions with respect to each other and when positioned between the side walls provide a feed hopper. The lower portions of the front and rear walls can be adjusted away or toward each other to increase or decrease the discharge of the feed from the hopper formed by said lower portions 7, in connection with the side walls of the body portion.

As the side walls of the body portion or housing are of the same construction, but one will be described, as the description of one will apply to the other and each side wall comprises a body portion 14 of rectangular contour and constructed from a sheet of metallic material of the desired gauge. The top of the body portion 14 is provided with an inwardly extending flange 15, which is coextensive with the top of the body portion 14 and has each end terminal portion thereof depressed, as at 16, and upon which is mounted an end terminal portion of a flange 12, see Figure 2. The body portion 14 at each side thereof is formed with an inwardly extending coupling portion 17, which is of U-shape in cross section, see Figure 7. Each coupling portion 17 is of a length equal to the height of the body portion 14 and the pair of coupling portions of each side wall, when the body portion is set up, opposes the outer face of the upper portions 6 of the front and rear walls of the body portion. The flanges 13 are adapted to be slid into the coupling portions 17, from the top thereof, whereby the front wall, rear wall and side walls of the body portion are detachably connected together. When the walls of the body portion are detachably connected together the end terminal portions of the flanges 12, seat upon the depressed terminal portions 16 of the flanges 15, whereby the front and rear walls are suspended from the side walls of the body portion. Each side wall further includes two sets of spaced openings. Each set is disposed at a downward inclination and one set is oppositely disposed with respect to the other set. The inclination of each set is downwardly and outwardly. The openings of one set are indicated at 18 and the openings of the other set at 19. The openings 18 in one side wall oppose the openings 18 in the other side wall, and a like arrangement is had with respect to the openings 19 formed in said side walls. The sets of openings are positioned in the side walls in proximity to the bottom thereof and opposed sets associate with a hold fast device 20 for retaining the lower portions 7 of the front and rear walls in adjusted position. The flanges 10 on the lower portion of the front and rear walls are provided with openings for the passage of the hold fast devices 20. Each hold fast device selectively extends through an opening of a set depending upon what position the lower portion 7 of the front or rear wall is positioned. The openings formed in the flanges 10 of the lower portion 7 of the front and rear walls are adapted to register with selected openings of opposed sets for the passage of the hold fast devices through the selected openings and the openings in the flanges 10, whereby the lower portions 7 of the front and rear walls are secured in adjusted position. Each hold fast device consists of a headed bolt and a nut. The nuts are indicated at 21 and are positioned against the inner faces of the flanges 10. See Figure 2.

The body portion or housing 1, further includes a removable bottom referred to generally by the reference character 22. The removable bottom comprises a base 23, a vertically disposed front 24, a vertically disposed rear 25, a pair of depending coupling members 26 which depend from each side of the base 23, a right angularly disposed inwardly extending portion 27 at the top of the front piece 24 and which provides a ledge, a depending forwardly inclined portion 28 which depends from the inner side of the ledge 27 and constitutes a stop or support, an inwardly extending right angularly disposed portion 29 at the top of the back or rear piece 25 and an outwardly inclined depending portion 30 which extends from the inner end of the ledge formed by the portion 29 and said portion 30 provides a stop or support. The supporting or stop functions for the portions 28 and 30 will be presently referred to. The bottom 22 is arranged between the lower portions of the side walls, and the lower end of each of these latter is formed with a vertically extending flange 31, arranged on the inner face thereof and said flanges are spaced from the inner faces of the side walls, and extending between the flanges and the side walls are the coupling strips or portions 26 whereby the bottom 22 is detachably connected to the side walls of the housing. The depending coupling strips or parts 26 maintain the base 23 a substantial distance above the lower ends of the side walls of the housing.

The ledges are arranged forwardly of the lower parts of the lower portions 7 of the front and rear walls of the housing and form in connection with the intermediate portions 8 of the front and rear walls of the housing, feed openings 32 for the fowls. The portions 7 are spaced a substantial distance from the ledges 27, 29 so that the fowls can have access to the feed which is discharged from the hopper into the bottom 22, the latter constitutes what may be termed a feed pan. The ledges 27 and 29 in proximity to the depending portions 28 and 30 are formed with lengthwise extending rows of spaced openings 33 arranged in pairs and are associated with the openings 9.

Positioned within each feed opening 32 is a series of arresting or restraining members and which act to prevent the fowls from raking out the feed. The arresting or restraining members depend from the intermediate portion of the front and rear walls and are disposed at an inward inclination. Each of the restraining members are indicated at 34 and is of inverted yoke-shape, although it is to be understood that any suitable form of restraining member could be employed. The arms of each member extend down through a pair of openings in an intermediate portion 8 and through a pair of openings in a ledge and are arrested or supported by an inclined portion 28. See Figure 2. The head 35 of each restraining member is positioned above the intermediate portion 8 of the front or rear wall see Figure 5.

The hold fast devices 20 not only provide means for detachably securing the lower portions 7 of the front and rear walls in adjusted position, but further provide means for detachably connecting the front and rear walls to the side walls. When the hold fast devices 20 are removed, the front and rear walls can be pulled upwardly or separated from the side walls and after the front and rear walls have been disconnected from the side walls, the bottom 22 can be shifted upwardly and disconnected from said walls. This permits of the body portion to be shipped in a knock-down condition.

The cover, lid or closure for the open top of the body portion or housing 1, consists of a body portion 34 of tapered cross section and a rim 36. The body portion 34 at its apex is formed with a pair of perpendicular extensions 35, which are co-extensive with the length of the feeder, and with one of the extensions forming a raw edge to prevent the fowls from roosting on the cover or closure. The body portion 34 at its bottom terminates in the rim 36 which corresponds in contour to the shape of the body portion or housing 1, and overlaps the top of the walls of the latter when the cover or closure is mounted in position to close the open top of the body portion or housing 1.

The body portion 34 is formed of a pair of end walls of triangular contour and a front and a rear wall 39, 40 respectively. The front and rear walls include oppositely disposed inclined parts and each inclined part terminates at its top, in a perpendicular extension 35, or in other words the front, as well as the rear wall, at the apex of the body portion 35, is bent upwardly forming the extensions 35 and these latter abut and are secured together, as at 41, but the top edge of the extension of the rear wall 40 is positioned below the top edge of the extension of the front wall 39, thereby providing the raw edge to prevent the roosting of the fowls on the cover or closure. The front and rear walls 39 and 40 are flanged as at 42 and overlap the end walls. The walls of the cover are bent to interengage with each other to provide a joint connection therebetween. The cover or closure for the open top of the body portion is constructed of sheet metal of the desired gauge and the walls and bottom of the body portion 1 are also constructed of sheet metal of the desired gauge.

The ledges 27, 29 and depending inclined portions 28, 30, prevent the fowls from dragging the feed out on the floor or ground.

It is thought that the many advantages of a poultry feeder, in accordance with this invention, can be readily understood, and although the preferred embodiment of the invention is as illustrated and described, yet it is to be understood that changes in the details of construction can be had which will fall within the scope of the invention as claimed.

What I claim is:

1. In a poultry feeder a housing including front and rear walls, a pair of side walls and a bottom, said front and rear walls and said bottom provided with inwardly extending coacting means to form a feed opening at the front and at the rear of said housing, and spaced restraining members directly connected to and supported by said coacting means and disposed throughout said openings.

2. In a poultry feeder a housing including a front, rear and side walls and a bottom, said front and rear walls having inherent means coacting with the side walls to provide a feed hopper discharging into said bottom, said bottom provided with inwardly extending means coacting with the front and rear of the feed hopper to form a feed opening at the front and rear of the housing.

3. A poultry feeder comprising a housing including front, rear and side walls and a bottom, said bottom formed with upwardly and inwardly extending means to provide a ledge at the front and rear of the housing and said ledges coacting with the front and rear walls to provide a feed opening at the front and rear of the housing said front and rear walls having hinged, integral lower portions inclining inwardly and forming in connection with the side walls a feed hopper discharging into said bottom, and restraining members extending through said hinged wall portions and ledges and across each of said openings and supported from the front and rear walls and said bottom.

4. A poultry feeder comprising a housing including front, rear and side walls and a bottom, said bottom formed with inwardly extending means to provide a ledge at the front and rear of the housing and said ledges coacting with the front and rear walls to provide a feed opening at the front and rear of the housing, said front and rear walls having the lower portions thereof inclining inwardly and forming in connection with the side walls a feed hopper discharging into said bottom, restraining members extending across each of said openings and supported from the front and rear walls and said bottom, said lower portions of the front and rear walls adjustable, and means for securing said lower portions in adjusted positions to regulate the discharge of the feed from the hopper into the bottom.

5. A poultry feeder comprising a housing including front, rear and side walls and a bottom having upwardly and inwardly extending means to provide a ledge coacting with a front or rear wall to provide a feed opening, said front and rear walls of less height than the side walls and each formed with an inwardly extending intermediate portion and an inwardly inclined bodily shiftable lower portion, said lower portion forming in connection with the side walls an adjustable feed hopper discharging into said bottom, restraining members extending through said intermediate portion and said means and across said opening, and means coacting with the side walls for maintaining said lower portions in shifted position.

6. A poultry feeder constructed in accordance with claim 5, said bottom formed with outwardly extending inclined portions depending from the inner side of said ledges and having said restraining members mounted thereon, and said restraining members removably mounted in position.

7. A poultry feeder comprising a housing including front, rear and side walls and a bottom, said front and rear walls each formed with an inwardly extending angularly disposed intermediate portion formed with openings, said bottom provided at its front and rear with an upstanding inverted L-shaped portion having the horizontal part thereof apertured and arranged in spaced alinement with said intermediate portion, the said intermediate portions providing hangers, and restraining members extending through the openings in said intermediate portions and through the apertures in said horizontal portions.

8. A poultry feeder constructed in accordance with claim 7, the openings in said intermediate portions arranged outwardly with respect to the apertures in said horizontal part.

9. A poultry feeder comprising an open top housing including front, rear and side walls and a bottom, said front and rear walls each consisting of an upper portion, an inwardly extending angularly disposed intermediate portion and an inwardly inclined lower portion, said front and rear walls of less height than said side walls, said bottom at the front and rear provided with upstanding parts opposing the lower ends of said lower portions and arranged below and spaced from said intermediate portion, said side walls and said bottom having coacting means for detachably connecting them together, the upper portions of the front and rear walls and the said side walls having coacting means for detachably connecting them together, said side walls provided with inwardly extending flanges at the top thereof and with the ends of each of said flanges depressed, and the upper portions of said front and rear walls formed with inwardly extending flanges seated on said depressed ends, and a rimmed top overlapping the open upper end of said body portion.

10. In a poultry feeder of that type including an open top body portion or housing, a removable closure for such top, said closure comprising upstanding front, rear and side walls constructed and arranged to provide a body portion of tapered cross section, said front and rear walls including oppositely disposed inclined portions terminating at their upper ends in perpendicular portions opposing each other, said perpendicular portions providing extensions at the apex of the tapered body portion, one of said extensions being of greater height than the other to provide a raw edge at the apex of the closure to prevent the roosting of fowls thereon, and holdfast means for securing said flanges together.

11. A poultry feeder comprising a housing formed of front, rear and side walls and a bottom, said front and rear walls each formed of one-piece material and including a vertically disposed stationary upper portion and an adjustable lower portion having its top inset with respect to the bottom of said upper portion, one of said vertically disposed portions coacting with said bottom to provide a feed opening, said adjustable lower portions extending towards each other at an inclination and coacting with the side walls to provide a hopper discharging into said bottom.

12. A poultry feeder comprising a housing formed of front, rear and side walls and a bottom, said front and rear walls each being unitary and formed of a vertically disposed stationary upper portion, an inwardly extending intermediate portion and a shiftable lower portion, one of said vertically disposed portions coacting with said bottom to provide a feed opening, the said shiftable lower portions extending towards each other at an inclination and coacting with the side walls to provide a hopper discharging into said bottom, said lower portions being adjustable for regulating the discharge from the hopper and formed with outwardly directed side flanges, and means coacting with said side walls and side flanges for maintaining said lower portions in adjusted positions.

13. A poultry feeder comprising a housing including front, rear and side walls and a bottom, said front and rear walls each formed of a single length of material and formed of a vertically disposed stationary upper portion, an inwardly extending intermediate portion and a shiftable lower portion, said bottom formed with upwardly and inwardly extending means at the front and rear thereof to provide a ledge at the front and rear of the housing, said ledges coacting with the bottom of the upper portions of the front and rear walls to provide a feed opening at the front and rear of the housing, and the said lower portions of the front and rear walls inclining towards each other and forming in connection with said side walls a feed hopper discharging into said bottom at a point spaced from said ledges.

14. A poultry feeder comprising a housing including front, rear and side walls and a bottom, said front and rear walls each formed of a single length of material and provided with a vertically disposed upper portion, an inwardly extending intermediate portion and a shiftable lower portion, said bottom formed with upwardly and inwardly extending means at the front and rear thereof to provide a ledge at the front and rear of the housing, said ledges coacting with the bottom of the upper portions and said intermediate portion of the front and rear walls to provide a feed opening at the front and rear of the housing, the said shiftable lower portions of the front and rear walls inclining towards each other and forming in connection with said side walls a feed hopper discharging into said bottom at a point spaced from said ledges, the said shiftable lower portions of the front and rear walls depending below said ledges and spaced inwardly therefrom.

15. A poultry feeder comprising a housing including front, rear and side walls and a bottom, said front and rear walls each formed of a single length of material and provided with a vertically disposed upper portion and a shiftable lower portion formed with outwardly directed side flanges, said bottom formed with upwardly and inwardly extending means at the front and rear thereof to provide a ledge at the front and rear of the housing, said ledges coacting with the bottom of the upper portions of the front and rear walls to provide a feed opening at the front and rear of the housing, the said shiftable lower portions of the front and rear walls inclining towards each other and forming in connection with said side walls a feed hopper discharging into said bottom at a point spaced from said ledges, said hinged lower portions being adjustable for controlling the discharge from the hopper, and means coacting with the side walls and side flanges for maintaining said lower portions in adjusted positions.

16. A poultry feeder comprising a housing including front and rear walls each formed with a vertically disposed stationary upper portion and an adjustable lower portion and one formed with an intermediate portion provided with openings, said housing further including side walls and a bottom, one of said vertically disposed portions coacting with said bottom to provide a feed opening, said lower portions extending towards each other at an inclination and coacting with the side walls to provide a hopper discharging into said bottoms, the openings in said intermediate portion providing means for connecting therewith restraining members to extend across said feed opening.

In testimony whereof, I affix my signature hereto.

BURL M. HALL.